United States Patent [19]

Engelsberger

[11] Patent Number: 4,601,930

[45] Date of Patent: Jul. 22, 1986

[54] CARRIER FILM BACKED WITH COMPOSITE FILM

[75] Inventor: Herbert Engelsberger, Viersen, Fed. Rep. of Germany

[73] Assignee: Feldmühle Aktiengesellschaft, Düsseldorf, Fed. Rep. of Germany

[21] Appl. No.: 544,617

[22] Filed: Oct. 24, 1983

[51] Int. Cl.[4] .............................................. B27N 5/02
[52] U.S. Cl. ........................................ 428/36; 428/349; 428/516; 428/520
[58] Field of Search .................... 428/349, 35, 36, 516, 428/520

[56] References Cited

U.S. PATENT DOCUMENTS

| | | | |
|---|---|---|---|
| 3,625,348 | 12/1971 | Berea | 426/106 |
| 3,949,042 | 4/1976 | Utz | 264/564 |
| 4,178,401 | 12/1979 | Weinberg et al. | 428/516 |
| 4,226,822 | 10/1980 | Yoshikawa et al. | 264/173 |
| 4,279,957 | 7/1981 | Hiraoka et al. | 428/36 |
| 4,424,243 | 1/1984 | Nishimoto et al. | 428/516 |
| 4,424,256 | 1/1984 | Christensen et al. | 428/349 |
| 4,450,028 | 5/1984 | Vilutis | 428/36 |

FOREIGN PATENT DOCUMENTS

| | | | |
|---|---|---|---|
| 32027 | 7/1981 | European Pat. Off. | 428/518 |
| 28854 | 3/1981 | Japan | 428/518 |

*Primary Examiner*—Edith Buffalow
*Attorney, Agent, or Firm*—Toren, McGeady, Stanger, Goldberg & Kiel

[57] ABSTRACT

A mutilayer film, as shown in FIG. 3, consists of a support film (6) and a blown, coextruded composite film (1), which is joined to the support films (6) by means of an adhesive (5) and is interlocked into a tube (1'). The layers of the composite film (1) consist of polyethylenes or polyethylene copolymers of different mechanical shock resistance. At least one of the polyethylenes or polyethylene copolymers has a mechanical shock resistance of more than 100 cN. The composite film (1), interlocked into a tube (1'), has two outer layers (A, A') of corresponding material and thickness and two inner layers, (B, B') of corresponding material thickness. The inner layers (B, B') are connected by interlocking and the outer layers (A, A') are connected to the inner layers (B, B') by melt bonding.

4 Claims, 3 Drawing Figures

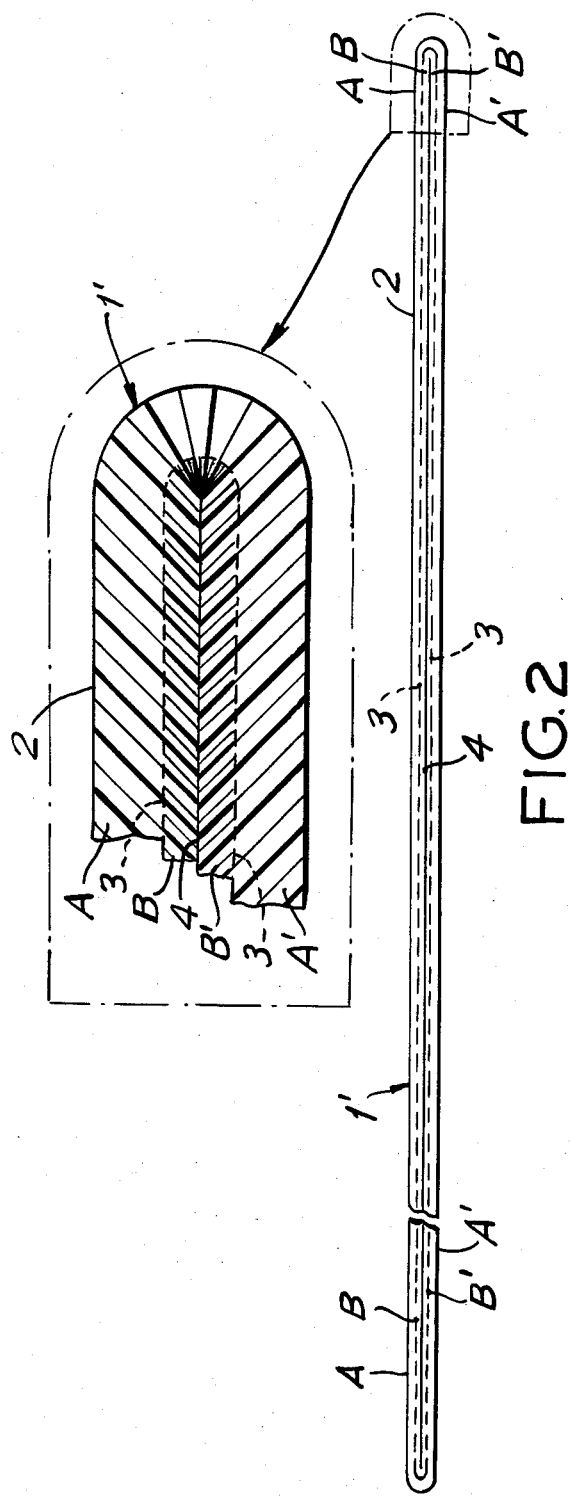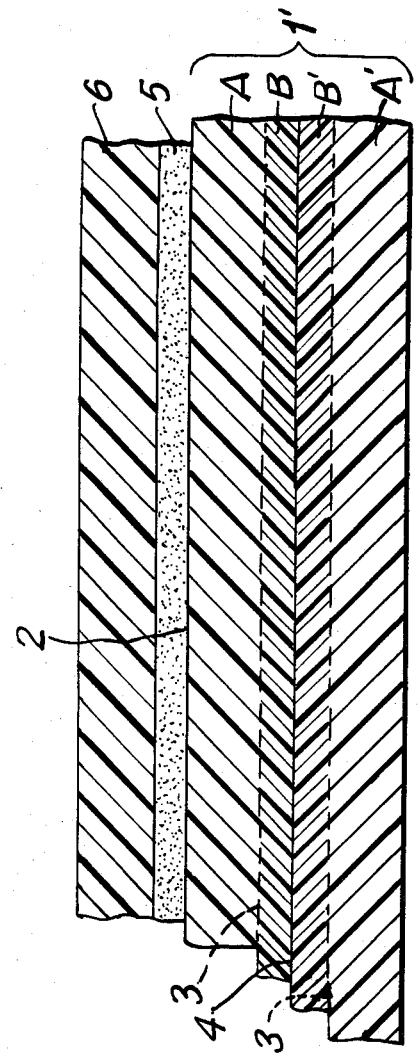
FIG.2
FIG.3

CARRIER FILM BACKED WITH COMPOSITE FILM

BACKGROUND OF THE INVENTION

1. Field of the Invention

The invention relates to multilayer films consisting of a single- or multilayer support film and a polyethylene or polyethylene copolymer composite film, which is joined to the support film by a lamination and whose layers are produced from polyethylene or polyethylene copolymers with mechanical shock resistances differing by at least 25 cN, and of which at least one polyethylene or polyethylene copolymer has a mechanical shock resistance greater than 100 cN, as measured by ASTM D 1709-62.

2. Description of the Prior Art

Multilayer films are known and used to a great extent, for example, in packaging foods. These films consist of a support film and a further single- or multilayer film, which is laminated to the support film. Usually, the support film is heat-resistant, stretched biaxially and, if necessary, lacquered. Preferably, it is produced from regenerated cellulose, polyester, polyamide, polypropylene or aluminum. It may also be formed from several individual films of the said materials. The support film forms the outer layer in the finished package and must therefore be readily printable.

The film, laminated on the support film, forms the inside of the finished package. This film or, in the case of a composite film, at least the layer, of which the inside of the package will later on consist, must be readily heat-sealable and, for reasons of good processability, have a low coefficient of friction so as to ensure good processability on packaging machines.

For various areas of application, this film construction has however not yet proven to be satisfactory, especially because the puncture resistance, particularly for vacuum packaging, is not yet adequate. Consequently, there may be serious failures, such as leaks which, for many foods, can lead to spoilage of the goods. It might seem obvious to compensate for the low puncture resistance by an increased film thickness. However, this is not possible because many packaging machines can process only films of a particular maximum thickness. In the case of coffee packaging machines, this maximum thickness is 110 μm.

Multilayer films of the aforementioned kind have therefore already been produced from support films and coextruded polyethylene films, which are laminated on the support films. The coextruded polyethylene composite films used consist of two layers joined together by a melt bond, one of which usually consists of the copolymer of a polyethylene of high mechanical shock resistance, that is, great toughness, and the other of a normal polyethylene (homopolyethylene, LDPE, low density polyethylene). Either the polyethylene layer of high mechanical shock resistance or—and this is preferred—the LDPE layer is joined to the support film by a lamination. Although it was possible to increase the puncture resistance by means of this system, these multilayer films also have deficiencies, so that they cannot be used satisfactorily in all areas. It is a disadvantage of such a multilayer film that it is insufficiently flat at elevated processing temperatures, so that breakdowns occur frequently, especially with packaging machines operating at high speed. The causes of this are, above all, the different coefficients of thermal expansion of the two layers of the composite film and the different film thicknesses of the two layers of the composite film, so that these act like a bi-metal. This phenomenon occurs particularly strongly in a multilayer composite film, in which the polyethylene layer of high mechanical shock resistance lies between the support layer and the the LDPE layer. On the other hand, if the polyethylene layer of high mechanical shock resistance is used as lower layer, the LDPE layer being laminated to the support film, the rolling tendency of the multilayer film is admittedly reduced. However, because the surface of the polyethylene layer of high mechanical shock resistance is generally dull, there are processing difficulties. The addition of lubricants to the polyethylene, from which this layer is produced, is possible but only within limits, because lubricants migrate into the other layers and reduce the strength of the lamination.

Owing to the fact that at least one layer of the coextruded composite film consists of a polyethylene or a polyethylene copolymer with a mechanical shock resistance greater than 100 cN, the known film admittedly has a certain puncture resistance, which however is not yet adequate for many areas of application.

Laminated plastics, which consist of several "interlocked" plastic films, are moreover known from the German Offenlegungsschrift No. 1,479,440. Rigid or semirigid plastic objects are formed from the laminated plastic by molding. It is noted that the object has a greater strength than a similar object produced from a single film of comparable thickness. Moreover, express reference is made to the greater vertical load carrying capacity of containers.

Furthermore, composite films are known (German Offenlegungsschrift No. 1,966,466 and German Offenlegungsschrift No. 2,102,377), which are formed by folding together blown tubes with walls of at least two coextruded layers. In these composite films, the inner layers are sealed together or melt bonded. As a result of the rotation of the blown film die, the molecules are oriented in crosswise directions in the folded walls of the tube. Consequently, the strength of the composite film as a whole is more balanced and improved.

It is an object of the invention to provide a multilayer, composite film of the aforementioned kind, which comprises a support and a composite film laminated on this support, has high puncture resistance, lies flat even at elevated temperatures and, if necessary, can slide well over metal on the side of the composite film opposite the support film.

To accomplish this objective, the invention provides for a coextruded composite film which is laminated on a support film, wherein the composite film is formed from a folded, two- to five-walled coextruded blown tube, the inner layers of the composite layers of the composite film being heat bonded and the outer layers being joined to the inner layers by melt bonding.

The decisive importance of the inventive multilayer film lies in the symmetrical construction of the coextruded composite film, which is laminated to the support film. The symmetrical construction, relative to the asymmetrical construction of the previously used two-layer composite films, causes the films to lie significantly flatter during processing, even at higher temperature differences. The initially described bi-metal effect does not occur because the forces, which lead to the tendency of the film to roll to the one side or the other, have been mutually eliminated by the symmetrical construction. The puncture resistance is increased. The higher puncture resistance is explained partly by the heat-bonding of the inner layers B, B'.

The composite film can be produced simply by blowing a multiwall tube and folding the tube while heat-bonding the inner layers. Moreover, the surface of the outer walls forming the outer layers is fused with the surface of the inner walls of the blown tube, which form the inner layers of the composite film. Using heat and pressure, the inner layers are interlocked or heat-bonded by means of a pair of press rolls. As a result of the customary rotation of the blown film die during manufacture of the tube, the orientation of the molecules between folded walls is crossed. Consequently, the strengths in the machine and cross directions are equalized to some extent. This leads to a further increase in puncture resistance.

Compared to previously known film constructions, which consist, for example, of a support film with an heat-bonded single-layer polyethylene film, the advantage arises that, for the same thickness of composite films, a significantly higher puncture resistance is achieved or, for the same puncture resistance, the total thickness of the composite film can be kept significantly lower, as a result of which a considerable savings of material and great advantages on the processing machines are achieved.

BRIEF DESCRIPTION OF THE DRAWINGS

FIG. 2 shows a cross-section of a composite film formed from the tube of FIG. 1 by heat-bonding the inner layers, layers A, A' being joined at 3 by melt-bonding to layers B, B'. The inner layers B, B' are heat-bonded along line 4. The side on which an electrical pretreatment was carried out before laminating, is numbered 2.

FIG. 3 shows an inventive multilayer film in schematic form in which the composite film shown in FIG. 2, is laminated with adhesive 5 on a single-layer support film of polyamide 6.

DETAILED DESCRIPTION OF THE PREFERRED EMBODIMENTS

Figure 1:
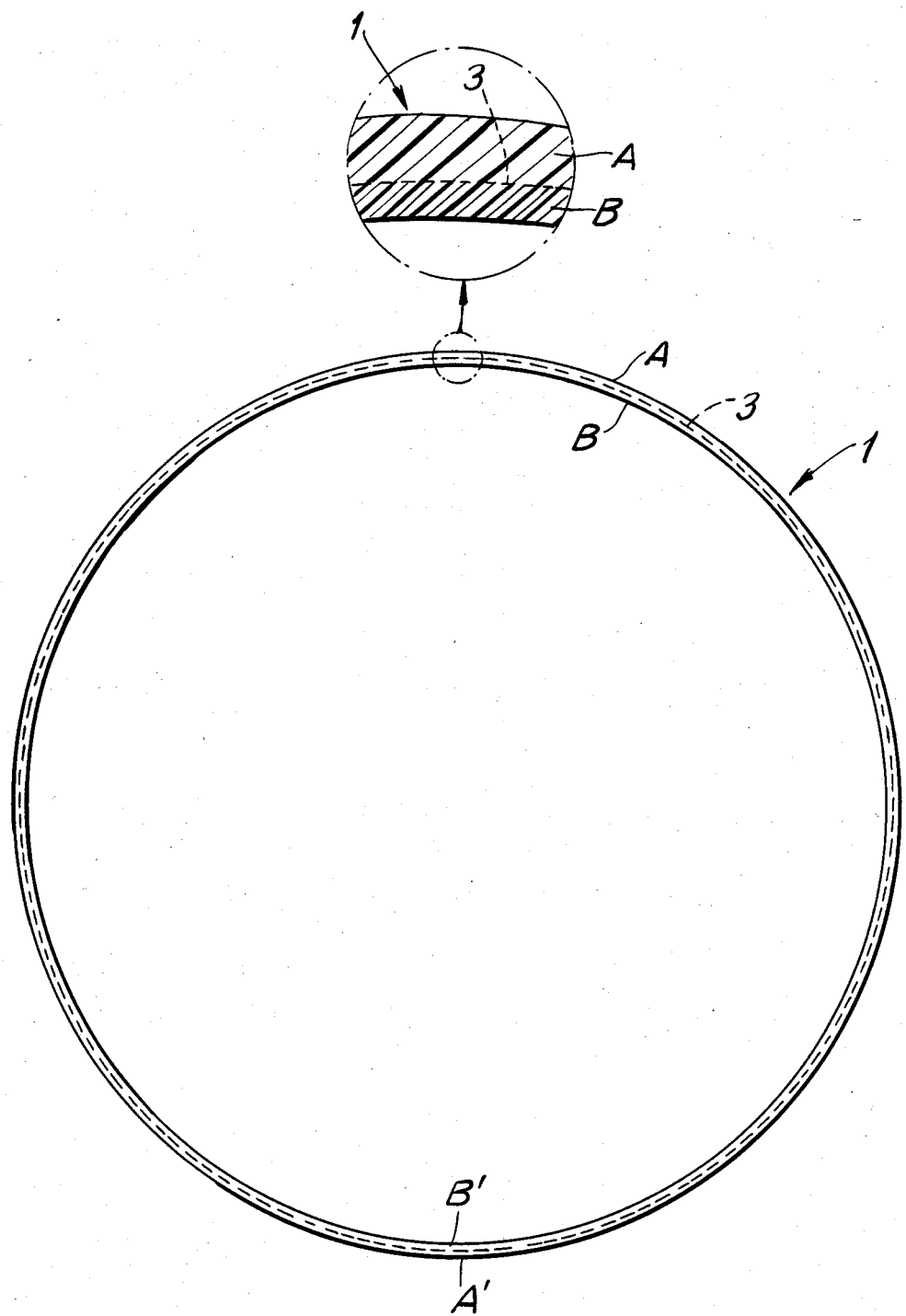
FIG. 1 shows a schematic representation of a two-walled coextruded blown tube in cross-section, the outer and inner layers of the coextrusion tube 1 being labelled A and B.

The blown, coextruded tube preferably has two walls. It may however also be advantageous for various areas of applications to use three- to five-walled tubes and to interlock these to form composite films with six or ten layers. In this manner, additional layers, of polyvinyl alcohol for example, with additional functions (gas barrier) may be provided.

The finished, heat-bonded, multilayer composite film is advisably pretreated electrically on one side by known procedures and laminated on the single- or multilayer support film by procedures, which are also known.

Besides selecting a polyethylene or polyethylene copolymer of high mechanical shock resistance, which is also planned for the next state of the art, it is important for the purposes of the invention that raw materials, which heat bond well under pressure and heat, be used for the inner layers of the composite film. On the other hand, raw materials, which can readily be heat-sealed and which have a low coefficient of friction on metal, should be used for the outer layers.

Ethylene/vinyl acetate copolymers, with up to 30 weight percent of vinyl acetate, have proven to be preferably suitable for the production of layers of coextruded composite film. Copolymers with 3 to 10 weight percent of vinyl acetate and a melt index of 0.2 to 4.0 and preferably of 0.5 to 1.5 are regarded as especially suitable. These copolymers can be used as outer and inner layers. These polyethylene/vinyl acetate copolymers may contain lubricants or antiblocking agents, depending on whether they are to be used as outer or inner layers. The use of layers of ethylene/vinyl acetate copolymers as inner layers is preferred, because these types of plastic can be interlocked well. On the other hand, because of their softness and poor frictional values on metal, as well as because of a certain odor of acetic acid, which increases with increasing vinyl acetate content, these materials are less suitable for producing the outer layers. Nevertheless, their use as outer layer is possible if the aforementioned disadvantages are not of decisive significance and if, on the other hand, excellent heat sealing properties are important.

LLDPE (linear, low density polyethylene), with a density of 0.918 to 0.945 and preferably of 0.922 to 0.930, is also especially suitable. The melt index of this polyethylene is of the order of 0.2 to 4.0. LLDPE with a melt index of 0.8 to 1.5 is especially preferred.

This group of polyethylenes can be used with and without a lubricant and may, if necessary, contain silicate as antiblocking agent. This raw material is preferably used in the outer layers as a material which is difficult to interlock. The mechanical shock resistance of LLDPE reaches peak values of 175 cN, for which reason such an LLDPE is outstandingly suitable for the purposes of the invention.

An ethylene/methacrylic acid copolymer, cross linked with the ions of sodium or zinc, which is also known under then name of ionomeric resin and which is manufactured by Dupont under the trade name of SURLYN, is especially preferred. The mechanical shock resistance of ionomeric resin, cross linked with sodium, is as high as 450 cN; this material is preferred for producing the inner layers B, B'. Besides outstanding mechanical shock resistance, this raw material is also distinguished by very good heat-bonding properties, oil resistance and good extrudability.

All mechanical shock resistance data in this Application is based on measurements carried out according to ASTM D 1709-62 with a drop height of 650 mm and a film thickness of 25 μm.

For the purposes of the invention, it has proven to be advantageous to form the inner layers from ethylene or polyethylene copolymers with a higher mechanical shock resistance than that of the outer layers.

The preferred material for the outer layers and for the polyethylene with a lesser mechanical shock resistance is LDPE. It is easily accessible, has outstanding machine running properties, good wear properties and is on the market in a broad range of types, so that the outer layer of the coextruded composite film, which is important for the heat-sealing process and which forms the inner layer of the package in the finished package, can easily be matched to the requirements of suitable packaging machines. Usually, LDPE with a density of 0.918 to 0.934 and preferably of 0.922 to 0.928 and a melt index of 0.2 to 4.0 and preferably of 0.7 to 2.0 is used.

Composite films of the following construction are preferably employed:

1. The two outer layers consist of LDPE, to which antiblocking and lubricant agents are added in the usual quantities. The two inner layers consist of a polyethylene/vinyl acetate copolymer. Such a multilayer film is especially suitable for vacuum packaging coffee, has outstanding surface properties and, owing to the inner layers of polyethylene/vinyl acetate copolymers, has outstanding puncture resistance.

2. The two outer layers consist of LLDPE, and the inner layers consists of a polyethylene/vinyl acetate copolymer. This variation has an even higher puncture resistance and can, moreover, be thermoformed.

3. The two outer layers consist of a polyethylene/vinyl acetate copolymer; the two inner layers consist of an ethylene/methacrylate copolymer, cross linked with sodium ions. This film has outstanding puncture resistance and is particularly suitable for thermoforming. This film is preferably used for packaging meat, cheese and nuts.

Films based on polyamide, polyester, polypropylene or regenerated cellulose, which are unstretched or stretched biaxially and applied with an adhesive, and which, if necessary, are additionally laminated with aluminum foil, are used as support film—just as they will be in the next state of the art.

For packaging which is not thermoformed, such as that used, for example, for vacuum packaging coffee, the total thickness of known multilayer films is approximately 100 μm, of which approximately 15 to 25 μm is due to the support film, which optionally consists of two layers. The usual thicknesses of laminated films, which are not thermoformed, are approximately 25 to 100 μm and generally 50 to 75 μm. It is not possible to produce the individual layers of coextruded composite film with average thicknesses less than 10 μm.

Preferably, the thickness of the outer layer amounts of ½ to 4/5 of the total thickness of the coextruded composite or of the interlocked tube; up to ½ of the total thickness then remains for the total thickness of the inner layers. The total thickness of the composite film falls within the range of at least 40 μm to no more than 500 μm, the preferred thickness range being 70 to 100 μm for films which are not thermoformed, while thermoformed film have a higher thickness, the preferred range lying between 80 and 250 μm.

The inventive, multilayer films can be used in wide areas of the packaging industry. However, they have proven to be especially suitable for vacuum packaging, which is subject to the danger of puncturing, and moreover for:

thermoformed vacuum packaging, especially for meat products, cheese and nuts, those with a support film of unstretched polyamide, as well as a coextruded composite film with outer layers of polyethylene/vinyl acetate copolymers and inner layers of ethylene/methacrylic acid copolymers, cross linked with metal ions, not thermoformed vacuum packaging, especially for coffee and similar oxygen-sensitive products, those with a support film of polyester film, laminated with aluminum, metallized or PVDC-lacquered (PVDC=polyvinylidene chloride) and stretched polyester or polyamide film, as well as a coextruded composite film with outer layers of an ethylene/vinyl acetate copolymer and inner layers of ethylene/methacrylic acid copolymer, cross linked with sodium ions, or outer layers A, A' of LLDPE and inner layers B, B' of ethylene/vinyl acetate copolymer.

EXAMPLE 1

Two-walled, blown, coextruded tubes with walls of different thickness are produced for preparing multilayer vacuum thermoforming film. The blown tube is subsequently heat-bonded. The outer layers A, A' of this four-layer composite film consist of polyethylene copolymer with 4.2 weight percent of vinyl acetate, a mechanial shock resistance of 145 cN and a melt index of 0.8. The two inner layers B, B' consist of a polyethylene/methacrylic acid copolymer, which is cross linked with sodium ions and has a mechanical shock resistance of 450 cN and a melt index of 1.4. The total thickness of the two outer layers A, A' amounts to ⅔ and the total thickness of the two inner layers B, B' to ⅓ of the total thickness of the heat-bonded tube. In a series of experiments, interlocked tubes with the above-described construction and total thicknesses of 80, 100, 120, 140, 160, 180, 200, 220 and 240 μm were produced.

The heat-bonded tubes were laminated with support films of unstretched polyamide 6, the thickness of the support film being half the thickness of the heat-bonded tube.

One of the above described, inventive, multilayer films, with a total thickness of 240 μm, was compared with a known thermoforming film in a comparative packaging experiment, in which curved, finely minced pork sausages were packaged. The known thermoforming film had a total thickness of 300 82 m and consisted of a 100 μm unstretched polyamide film and of a two-layer composite film of polyethylene copolymer with 8 weight percent of vinyl acetate, which was joined by heat-bonding to the polyamide film and each of whose individual layers was 100 μm thick. In spite of the fact that the thickness was reduced by 60 μm and that the vinyl acetate content was lower, the inventive, multilayer film had better thermoforming properties (shown especially by a cleanly drawn out trough) and fewer puncture leaks than the known film.

In a further comparison experiment, one of the inventive multilayer films described in Example 1, with a total thickness of 360 μm, was compared with a conventional, multilayer film with layers of polyamide/LDPE/LDPE/polyamide/LDPE and a total thickness of 365 μm. The known multilayer film was combined from two polyamide/polyethylene composite films by melt extrusion with polyethylene into a five-layer film. Such films are used for packaging long-keeping sausages, which are known under the name of "Pfefferblock". Equally good production results were achieved in spite of the slightly reduced total thickness. The actual advantage however lies in the fact that the inventive film requires a significantly lower production effort, namely only one laminating process instead of the three of the previous film.

EXAMPLE 2

The multilayer films used consist of a metallized 12 μm polyester film as support material and three different composite films, which are produced by extrusion blown molding and heat-bonding of the tubes so formed.

I: The two outer layers A, A' of the composite film consist of LDPE with a mechanical shock resistance of 86 cN and a melt index of 2.0; the two inner layers B, B' consist of polyethylene/vinyl acetate copolymer containing 5 weight percent of vinyl acetate, and have a mechanical shock resistance of 150 cN and a melt index of 2.0.

II: The two outer layers consist of LLDPE with a mechanical shock resistance of 175 cN and a melt index of 1.0; the two inner layers are similar to those described under I.

III: The two outer layers A, A' consist of a polyethylene copolymer containing 3 weight percent of vinyl acetate, and have a mechanical shock resistance of 150 cN and a melt index of 2.0. The two inner layer B, B' consist of a polyethylene/methacrylic acid copolymer, cross linked with sodium ions, and have a mechanical shock resistance of 450 cN and a melt index of 1.4.

The total thickness of the composite film in all three variations amounted to 85 μm, of which ⅔ was due to the outer layers A, A' and ⅓ to the inner layers B, B'. The total thickness, including the adhesive and the support film, was 100 μm.

As comparison material, a metallized polyester film was laminated as support film with an 85 μm polyethylenle (LDPE) film. This film, including the adhesive, had a total thickness of 100 μm.

In packaging experiments, in which coffee was vacuum packed into 250 g packages on a spike wheel machine, the inventive films resulted in a significantly lower leakage rate.

EXAMPLE 3

In a further experiment, in which coffee was vacuum packed into 250 and 500 g vacuum packages on a bag forming, filling and sealing machine, the films, described in the following, were used and compared.

An inventive, multilayer film consisted of a biaxially stretched 15 μm polyamide film laminated with a 12 μm aluminum foil, and of a coextruded four-layer composite film, which was produced by heat-bonding a tube and whose outer layers A, A' consisted of LDPE with a mechanical shock resistance of 86 cN and a melt index of 0.8 and whose inner layers B, B' consisted of a polyethylene/vinyl acetate copolymer, whose vinyl acetate content was 5 weight percent and which had a mechanical shock resistance of 150 cN and a melt index of 2.0. The thickness of the two outer layers A, A' together amounted to 50 μm, that of the inner layers B, B' together to 25 μm. The finished, laminated multilayer film had a total thickness of 105 μm.

A conventional film was used for comparison. It consisted of the same support material as that described above and of a 75 μm LDPE film with a mechanical shock resistance of 86 cN and a melt index of 0.8. The total thickness, including the adhesive, amounted to 105 μm.

In a packaging experiment in which coffee was vacuum packed, a 40% lower leakage rate was achieved with the inventive film.

I claim:

1. In a multilayer film composed of a single or multilayer support film laminated to a composite film, the improvement which comprises said composite film being formed from a folded coextruded blown tube having at least two contiguous layers, one of which is an outermost layer and the other of which is an innermost layer, the contacting surfaces of the outermost and innermost layers being fused to one another, and said innermost layer being folded and heat-bonded upon itself, said tubes further having up to three additional layers between the outermost and innermost layers, said additional layers and said outermost and innermost layers being different from one another and having mechanical shock resistances which differ by at least 25 cN, at least one of said innermost or outermost layers having a mechanical shock resistance greater than 100 cN as measured by ASTM D 1709-62, the outermost layers being selected from the group consisting of LLDPE having a melt index from 0.2 to 4 and LDPE having a melt index from 0.2 to 4 and the innermost layers being selected from the group consisting of LLDPE having a melt index from 0.2 to 4, and LDPE having a melt index from 0.2 to 4, and polyethylene/vinyl acetate copolymer.

2. The multilayer film of claim 1 wherein the innermost layer of the composite film has the higher mechanical shock resistance.

3. The multilayer film of claim 1 wherein the polyethylene or polyethylene copolymer of the innermost layer of the composite film has a mechanical shock resistance of 120 to 460 cN and the polyethylene or polyethylene copolymer of the outermost layer has a mechanical shock resistance of 60 to 175 cN.

4. The multilayer film of claim 1 wherein at least one of the additional layers is formed from polyvinyl alcohol.

* * * * *